(12) United States Patent
Yu et al.

(10) Patent No.: US 8,154,250 B2
(45) Date of Patent: Apr. 10, 2012

(54) BATTERY CHARGING CONTROLLER AND BATTERY MODULE USING THE SAME

(75) Inventors: Chung-Che Yu, Yonghe (TW);
Shian-Sung Shiu, Yonghe (TW)

(73) Assignee: Green Solution Technology Co., Ltd., New Taipei (TW)

( * ) Notice: Subject to any disclaimer, the term of this patent is extended or adjusted under 35 U.S.C. 154(b) by 505 days.

(21) Appl. No.: 12/400,375

(22) Filed: Mar. 9, 2009

(65) Prior Publication Data
US 2009/0315515 A1 Dec. 24, 2009

(30) Foreign Application Priority Data
Jun. 20, 2008 (TW) ................................ 97123203 A

(51) Int. Cl.
*H02J 7/00* (2006.01)
*H02J 3/14* (2006.01)

(52) U.S. Cl. ........ 320/116; 320/118; 320/119; 320/120; 320/124; 320/135; 307/41

(58) Field of Classification Search .................. 320/116, 320/120, 124, 135, 118; 307/41
See application file for complete search history.

(56) References Cited

U.S. PATENT DOCUMENTS

| | | | | |
|---|---|---|---|---|
| 5,680,027 A * | 10/1997 | Hiratsuka et al. | ............. | 320/106 |
| 6,081,095 A | 6/2000 | Tamura et al. | | |
| 6,664,766 B2 * | 12/2003 | Desprez et al. | ................ | 320/167 |
| 7,061,207 B2 * | 6/2006 | Patel et al. | ...................... | 320/119 |
| 7,307,402 B2 * | 12/2007 | Parent et al. | ................... | 320/118 |
| 7,463,009 B2 * | 12/2008 | Chang et al. | ................... | 320/121 |
| 7,504,804 B2 * | 3/2009 | Johnson et al. | ................ | 320/150 |
| 2006/0022639 A1 * | 2/2006 | Moore | .......................... | 320/116 |
| 2006/0164038 A1 * | 7/2006 | Demers et al. | ................ | 320/116 |
| 2008/0012529 A1 * | 1/2008 | Chang et al. | ................... | 320/116 |

FOREIGN PATENT DOCUMENTS

| | | |
|---|---|---|
| CN | 201018294 Y | 2/2008 |
| JP | H7-87675 A | 3/1995 |
| JP | H8-55643 A | 2/1996 |
| JP | P2005-192281 A | 7/2005 |
| JP | P2007-267563 A | 10/2007 |

* cited by examiner

*Primary Examiner* — Patrick Assouad
*Assistant Examiner* — Steve T Chung
(74) *Attorney, Agent, or Firm* — Jianq Chyun IP Office

(57) ABSTRACT

The present invention discloses a battery charging controller for achieving a balanced battery charge. The battery charging controller includes a voltage divider, a switch module and a balance circuit. A reference voltage generated by the voltage divide is used to determine which battery unit in a battery module has an insufficient voltage lower than the others, so that the balance circuit controls the switch module to allow a larger current to charge a lower-voltage battery than a higher-voltage battery, so as to result in substantially the same voltage for each fully charged battery of the battery module.

16 Claims, 2 Drawing Sheets

BATTERY CHARGING CONTROLLER AND BATTERY MODULE USING THE SAME

FIELD OF THE INVENTION

The present invention relates to a battery charging controller and a battery module using the battery charging controller, and more particularly to a battery charging controller for balancing a battery charge and a battery module using the battery charging controller.

BACKGROUND OF THE INVENTION

As portable electronic products are developed rapidly, the demand for rechargeable batteries becomes increasingly larger. Rechargeable batteries include the conventional Ni—Ca battery, Ni—H battery, and Li-ion battery as well as the recently developed Li-polymer battery. The voltage provided by different type of rechargeable battery varies, and the required operating voltages of the portable electronic products are different. Therefore, battery manufacturers usually connect several batteries in series to produce a battery module for providing a voltage capable of meeting the operating voltage requirement of the portable electronic products.

When the electric power of batteries of a battery module is exhausted, it is necessary to recharge the battery by a battery charger for the next time of use. However, the battery capacity is different due to mismatch in manufacture and application. For example, a 7.4V lithium battery module is formed by connecting two pieces of 3.7V lithium batteries in series. For factory default setting, the electric power storage capacities of the two pieces of batteries are 80% and 70% respectively. Since the lithium batteries will be damaged if they are overcharged, therefore the lithium battery charger will stop charging the battery module as soon as any one of the lithium batteries therein is fully charged. Now, the electric power storage capacities of the two batteries are 100% (maximum level of a battery charge) and 90% respectively. The battery module can be used until the electric power storage capacity of any one of the batteries therein drops to 0% (minimum level of a battery discharge). Therefore, it is necessary recharge the battery module for a further use when the electric power storage capacities of the two batteries drop to 10% and 0% respectively.

From the description of the aforementioned example, the electric power storage capacities of batteries in a battery module are different, and thus the actual use of electric power storage capacity of the battery module is determined by the battery with the lowest electric power storage capacity. In addition to the variation of factory default electric power storage capacity of each battery of a battery module, a battery also self-discharges electric power, when the battery is not in use. Since each battery self-discharges electric power at a different rate, therefore an unbalanced electric power storage capacity will result among the batteries, and the usable capacity of the battery module is reduced as the using time of the battery increases, and the efficiency of using battery module becomes lower, and the using time of the battery module from fully charged to empty becomes shorter.

With reference to FIG. 1 for a schematic circuit diagram of a digital battery balancing controller disclosed in a datasheet of the Intersil ISL9208 product, a digital battery balancing controller 10 comprises a battery balance microprocessor 5 and a plurality of transistor switches S1-S7. The transistor switches S1-S7 are connected with a plurality of batteries BAT1-BAT7 in parallel through a plurality of resistors R1-R7 respectively. The voltage of the batteries BAT1-BAT7 is converted into a digital signal through an analog-to-digital converter (A/D converter), and the battery balancing controller 5 determines a higher-voltage battery by a built-in algorithm according to the digital signal of the voltage of the batteries BAT1-BAT7 and conducts the transistor switch connected in parallel to the higher-voltage battery, such that the charging current of each battery can be adjusted according to the voltage of each battery to achieve a balanced charging function. However, the voltage of each battery must be converted into a digital signal by an analog-to-digital converter before the digital battery balancing controller 5 processes, and the analog-to-digital converter increases the chip area 10 of the digital battery balancing controller 10 significantly and incurs a high cost. In addition, the digital battery balancing controller 5 is restricted by its design, such as the ISL9208 chip can support a battery module composed of 5 to 7 pieces of batteries only, and the scope of applicability is limited.

SUMMARY OF THE INVENTION

In view of the high cost of the conventional digital battery balancing controller, the present invention adopts an analog battery charging controller to achieve a balanced charge of batteries. Since the determining circuit of the analog controller comes with an area smaller than that of the analog-to-digital converter, the cost is lower, and the controller can be applied to a battery module composed of any number of batteries to give a broad scope of applicability.

Therefore, the primary objective of the present invention is to achieve the foregoing advantages by providing a battery balanced charging controller, comprising a voltage divider, a switch module and a balance circuit for balancing the charge of a first battery and a second battery. A negative terminal of the first battery is electrically coupled to a positive terminal of the second battery to from a connecting point, wherein a positive terminal of the first battery forms a first terminal and a negative terminal of the second battery forms a second terminal respectively. The voltage divider is coupled between the first terminal and the second terminal for providing an upper reference potential level and a lower reference potential level, and the potential level of the upper reference is higher than the lower reference potential level. The switch module comprises a first switch and a second switch, and the first switch is coupled to the first terminal and the connecting point, and the second switch is coupled to the second terminal and the connecting point. The balance circuit is coupled to the connecting point, the voltage divider and the switch module, and the balance circuit determines whether to pass a balanced charging current through the first switch or the second switch according to the potential level of the connecting point, the upper reference potential level and the lower reference potential level.

The present invention also provides a battery module, comprising (N+1) battery units and N battery balanced charging controllers, wherein N is an integer greater than zero. The (N+1) battery units are electrically connected in series, wherein the $M^{th}$ battery balanced charging controller is coupled to a first terminal, a second terminal and a connecting point of both serially connected $M^{th}$ battery unit and $(M+1)^{th}$ battery units, and the $M^{th}$ battery balanced charging controller determines the potential level of the $M^{th}$ battery unit and the $(M+1)^{th}$ battery units according to the first terminal, the second terminal and the connecting point. If the potential difference between the $M^{th}$ battery unit and the $(M+1)^{th}$ battery units is greater than a predetermined percentage, a balanced charging current is conducted to the battery unit with the lower potential level.

The above and other objects, features and advantages of the present invention will become apparent from the following detailed description taken with the accompanying drawing.

DESCRIPTION OF THE PREFERRED EMBODIMENT

Figure 1:
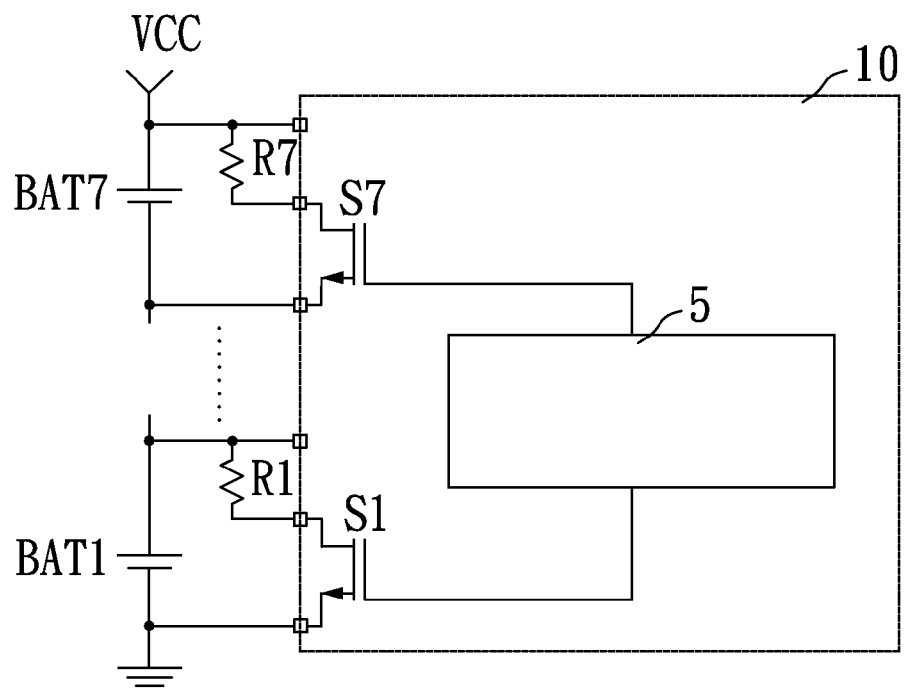
FIG. 1 is a schematic circuit diagram of a conventional digital battery balancing controller.
Figure 2:
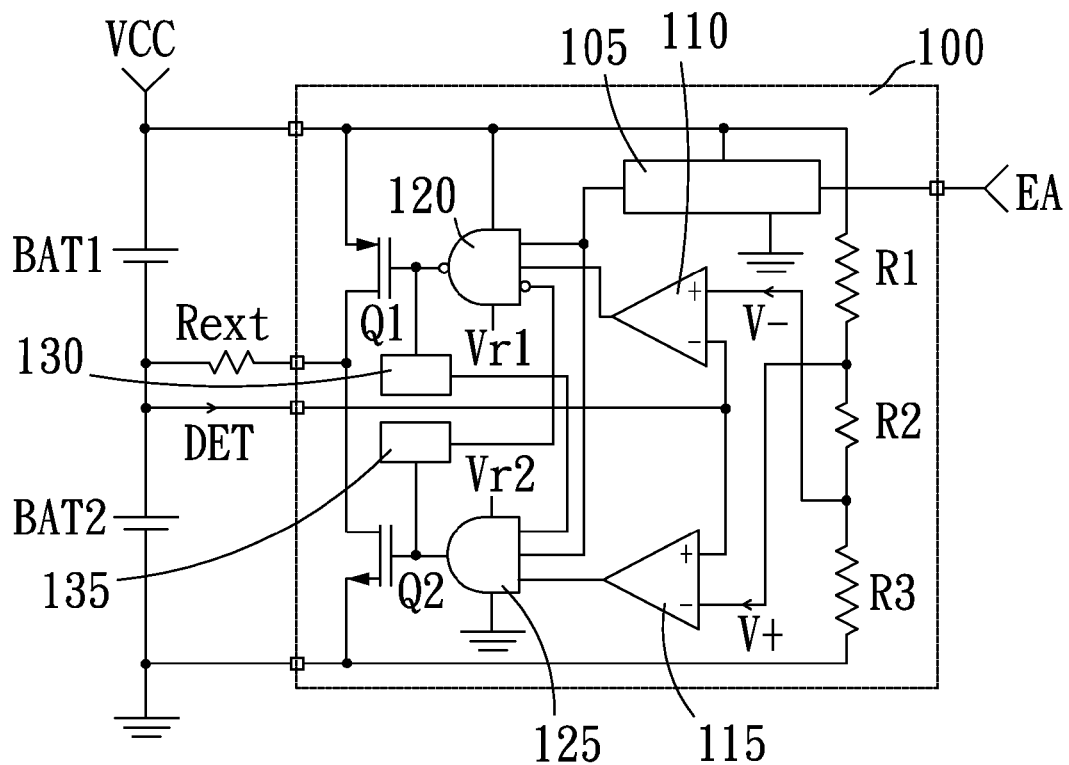
FIG. 2 is a schematic circuit diagram of a battery balanced charging controller in accordance with a preferred embodiment of the present invention.

With reference to FIG. 2 for a schematic circuit diagram of a battery balanced charging controller in accordance with a preferred embodiment of the present invention, the battery balanced charging controller 100 comprises a voltage divider, a switch module and a balance circuit. The voltage divider comprises a first resistor R1, a second resistor R2 and a third resistor R3, and the first resistor R1 is coupled to a positive terminal of a first battery BAT1, and the third resistor R3 is coupled to a negative terminal of a second battery BAT2. The second resistor R2 is coupled to the first resistor R1 for producing an upper reference potential level V+, and coupled to the third resistor R3 for producing a lower reference potential level V−. The impedances of the first resistor R1 and the third resistor R3 are equal, and the impedance of the second resistor R2 is smaller than the impedance of the first resistor, preferably R1:R2:R3=100:1:100. The switch module comprises a first switch Q1 and a second switch Q2, and the first switch Q1 is coupled to a positive terminal of the first battery BAT1 and a connecting point of the first battery BAT1 and the second battery, and the second switch Q2 is coupled to a negative terminal of the second battery BAT2 and the connecting point. To limit the magnitude of current passing through the first switch Q1 or the second switch Q2, preferably the switch module is coupled to the connecting point through a resistor Rext to prevent the batteries from being damaged by the overcharge current or the battery balanced charging controller 100 from being over heated. The balance circuit, coupled between the voltage divider and the switch module, comprises a first comparator 110, a second comparator 115, a NAND gate 120 and an AND gate 125. A non-inverting terminal of the first comparator 110 is coupled to the connecting point of the second resistor R2 and the third resistor R3, and an inverting terminal of the first comparator 110 is coupled to the connecting point of the first battery BAT1 and the second battery BAT2. An inverting terminal of the second comparator 115 is coupled to the connecting point of the second resistor R2 and the first resistor R1, and a non-inverting terminal of the second comparator 115 is coupled to the connecting point of the first battery BAT1 and the second battery BAT2.

To assure the battery balanced charging controller 100 of the normal operation, the battery balanced charging controller 100 further comprises a processing unit 105 including an over-temperature protection unit, an under voltage lockout unit and a start detection circuit. The over-temperature protection unit detects the temperature of the battery balanced charging controller 100. If the temperature exceeds an over-temperature protection point, the over-temperature protection unit will generate an over-temperature protection signal to prevent the battery balanced charging controller 100 from being overheated or damaged. The under voltage lockout unit is coupled to a positive terminal of the first battery BAT1 and a negative terminal of the second battery BAT2. If the potential difference between both terminals is lower than a predetermined starting voltage, the under voltage lockout unit will generate an under voltage signal to prevent an abnormal operation of the battery balanced charging controller 100 due to an insufficient operating voltage. After the start detection circuit receives a start signal EA of a high potential level, the battery balanced charging controller 100 is started, and such arrangement assure the battery balanced charging controller 100 to operate after the first battery BAT1 and the second battery BAT2 enter into a charging state. If there no start signal EA (or a start signal EA with a low potential level) is received, then the battery balanced charging controller 100 is at an OFF state, and the battery balanced charging controller 100 almost consumes no power at all. Unless the battery is at a charging state, the battery balanced charging controller 100 does not consume any battery power and achieve a power-saving effect.

The NAND gate 120 is coupled to the processing unit 105 and the first comparator 110 for controlling a switching of the first switch Q1 according to signals outputted from the processing unit 105 and the first comparator 110. To prevent the potential level of a signal outputted by the NAND gate 120 being too low and damaging the first switch Q1, the NAND gate 120 can be connected to an operating voltage Vr1 higher than the voltage at the negative terminal of the second battery BAT2 in order to prevent an output of a signal with a too-low potential level. The AND gate 125 is coupled to the processing unit 105 and the second comparator 115 for controlling the switching of second switch Q2 according to signals outputted from the processing unit 105 and the second comparator 115. To prevent the potential level of a signal outputted by the AND gate 125 being too high and damaging the second switch Q2, the AND gate 125 can be connected to an operating voltage Vr2 lower than the voltage at a positive terminal of the first battery BAT1 in order to prevent an output of a too-high potential level. To prevent the first switch Q1 and the second switch Q2 from damaging due to the first switch Q1 and the second switch Q2 simultaneously being conducted to pass through over currents, the battery balanced charging controller 100 further comprises a time delay unit coupled to the balance circuit and the switch module, such that one of the first switch Q1 and the second switch is conducted after a predetermined time interval from the other of the first switch Q1 and the second switch being cutoff, so as to avoid the issue of both switches being conducted at the same time.

The operation of the battery balanced charging controller 100 is described as follows. If the start signal EA is of a high potential level, indicating that the first battery BAT1 and the second battery BAT2 of the battery module enter into a charging state, the processing unit 105 will determine whether an abnormal condition exists or not, such as a voltage difference between the first terminal of the battery module (which is the positive terminal of the first battery) and the second terminal of the battery module (which is the negative terminal of the second battery) is lower than a predetermined starting voltage, or the battery balanced charging controller 100 is under an over-temperature condition. If the potential difference and temperature are normal, then the processing unit 105 will issue a high potential level signal to start operating the battery balanced charging controller 100, or else the processing unit 105 will issue a low potential level signal to stop operating the battery balanced charging controller 100.

Assumed that both of the first battery BAT1 and second battery BAT2 are lithium batteries, and the rated voltage is 3.7V, and the fully charged voltage is 4.2V, and the voltages of the first battery BAT1 and the second battery BAT2 are 2.8V and 2.5V before being charged, and the battery module is plugged into a charging socket, the voltage supplied by the battery module will be 5.3V (=2.8V+2.5V), and thus the upper reference potential level V+ is 5.3V*(R2+R3)/(R1+R2+R3)□2.663V, and the lower reference potential level V− is 5.3V*R3/(R1+R2+R3)□2.639V, where R1:R2:R3=100:1:100. Now, a voltage signal DET at the connecting point of the first battery BAT1 and the second battery BAT2 is 2.5V, and the first comparator 110 outputs a first comparison signal with a high potential level and the second comparator 115 outputs a second comparison signal with a low potential level. Without any abnormal condition, the processing unit 105 also outputs a high potential level signal, such that the AND gate 125 outputs a low potential level signal to turn off the second switch Q2 (which is a n-type MOSFET in this embodiment), and the NAND gate 120 outputs a low potential level signal to turn on the first switch Q1 (which is a p-type MOSFET in this embodiment) for passing a balanced charging current through the first switch Q1. The second battery BAT2 having a lower voltage receives a charging current greater than the charging current received by the first battery BAT1 having a higher voltage by an additional balanced charging current, so that the battery voltages of the two batteries can become closer during the charging process. In the example above, if the potential level DET of the connecting point is lower than the lower reference potential level V−, the balanced charging current will pass through the first switch Q1, and if potential level DET of the connecting point is higher than the upper reference potential level V+, indicating that the battery voltage of the first battery is lower, the balanced charging current will pass through the second switch Q2.

Since the present invention divides a voltage by using a resistor, a reference potential level is generated according to the ratio of the impedances of the resistors to determine whether or not it is necessary to perform a balanced charging operation by the balanced charging current. If the voltage difference between the first battery BAT1 and the first battery BAT2 is lower than a predetermined percentage, the battery balanced charging controller 100 will turn off the first switch Q1 and the second switch Q2. In the aforementioned example, the predetermined percentage is 1%.

During the processing of charging the first battery BAT1 and the second battery BAT2, if the start signal EA to be changed into a low potential level or an abnormal condition occurs (such as the balanced charging current passes through the switch module or other factors causing the battery balanced charging controller 100 to have a temperature higher than a predetermined over-temperature protection point or the operating voltage of the battery balanced charging controller 100 is lower than a predetermined starting voltage), the processing unit 105 will output a low potential level signal to stop the operation of the battery balanced charging controller until the foregoing condition is removed. Since a noise of the circuit may causes a potential level DET of the connecting point varying to be lower than the lower reference potential level V− and higher than the upper reference potential level V+, both first switch Q1 and second switch Q2 will be turned on at the same time. Therefore the battery balanced charging controller 100 can install a time delay unit comprising a first time delay device 130 and a second time delay device 135 to avoid the issue of both of the first switch Q1 and the second switch Q2 being conducted at the same time. If the NAND gate 120 outputs a low potential level signal to turn on the first switch Q1, while driving the AND gate 125 to output a low potential level signal to turn off the second switch Q2, the AND gate 125 will be able to output a high potential level signal to turn on the second switch Q2 until the first delay device 130 receives a signal of high potential level output by the NAND gate 120 and outputs a signal of high potential level after a predetermined delay time from receiving. Similarly, if the AND gate 125 outputs a high potential level signal to turn on the second switch Q2, while driving the NAND gate 120 to output a high potential level signal to turn off the first switch Q1, the NAND gate 120 will be able to output a low potential level signal to turn on the first switch Q1 until the second time delay device 135 receives a signal of low potential level output by the AND gate 125 and outputs a signal of low potential level after a predetermined delay time from receiving. With the foregoing arrangement, we can assure that one of the first switch Q1 and the second switch is conducted after a predetermined time interval from the other of the first switch Q1 and the second switch being cutoff, so as to avoid the issue of both switches being conducted at the same time The battery balanced charging controller 100 of the invention not only provides a battery balanced charging effect for two serially connected batteries, also applies the battery balanced charging effect to three or more serially connected battery balanced charging. If battery module includes (N+1) serially connected battery units, N battery balanced charging controllers will be used, so that any two connected battery units has a battery balanced charging controller for the balanced charging.

Figure 3:
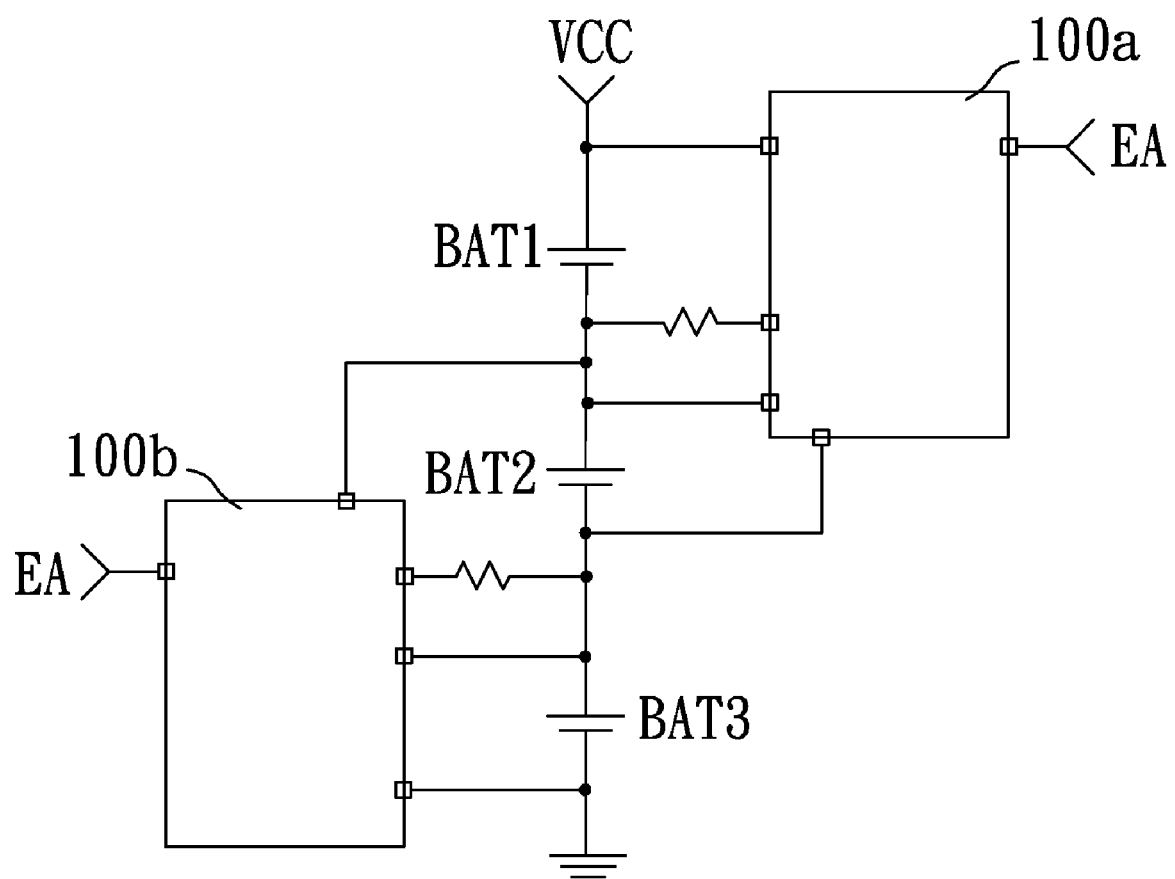
FIG. 3 is a schematic circuit diagram of a built-in battery module of a battery balanced charging controller in accordance with the present invention.

With reference to FIG. 3 for a built-in battery module of a battery balanced charging controller in accordance with the present invention, a battery module composed of three battery units is used for illustrating the invention. The first battery balanced charging controller 100a is coupled to a positive terminal of a first battery unit BAT1, a negative terminal of a second battery unit BAT2 and a connecting point of the two battery units BAT1, BAT2. The second battery balanced charging controller 100b is coupled to a positive terminal of the second battery unit BAT2, a negative terminal of a third battery unit BAT3 and a connecting point of the two battery units BAT2, BAT3. While the battery module is being charged, a start signal EA is at a high potential level to start the first battery balanced charging controller 100a and the second battery balanced charging controller 100b. The first battery balanced charging controller 100a compares the voltages of the first battery unit BAT1 and the second battery unit BAT2. If a higher-potential battery unit has a potential level greater than a lower-potential battery unit by a predetermined percentage, a switch connected to the higher-potential battery unit in parallel will be turned on, so as to conduct a balanced charging current to the lower-potential battery unit. In the meantime, the second battery balanced charging controller 100b also compares the voltages of the second battery unit BAT2 and the third battery unit BAT3 to pass the balanced charging current to a lower-potential battery unit having a voltage when the voltage difference between the second battery unit BAT2 and the third battery unit BAT3 is lower than a predetermined percentage. Therefore, the battery module with the built-in battery balanced charging controller in accordance with the present invention can assure that each battery unit in the battery module is fully charged and the battery module has better efficiency and longer using time than those of a general battery module.

As described above, the present invention completely fulfills the three requirements on patent application: innovation, advancement and industrial usability. In the aforementioned texts the present invention has been disclosed by means of preferred embodiments thereof; however, those skilled in the art can appreciate that these embodiments are simply for the illustration of the present invention, but not to be interpreted as for limiting the scope of the present invention. It is noted that all effectively equivalent changes or modifications on these embodiments should be deemed as encompassed by the scope of the present invention. Therefore, the scope of the present invention to be legally protected should be delineated by the subsequent claims.

What is claimed is:

1. A battery balanced charging controller, for balancing a battery change of a first battery and a second battery, and a negative terminal of the first battery being electrically coupled to a positive terminal of the second battery to form a connecting point, and a positive terminal of the first battery forming a first terminal, and a negative terminal of the second battery forming a second terminal, and the battery balanced charging controller comprising:

a voltage divider, coupled between the first terminal and the second terminal, for providing an upper reference potential level and a lower reference potential level, and the upper reference potential level being higher than the lower reference potential level;

a switch module including a first switch and a second switch, and the first switch being coupled to the first terminal and the connecting point, and the second switch being coupled to the second terminal and the connecting point;

a balance circuit, coupled to the connecting point, the voltage divider and the switch module, and the balance circuit determining whether to pass a balanced charging current through the first switch or the second switch according to a potential level of the connecting point, the upper reference potential level and the lower reference potential level; and an under voltage lockout unit coupled to the first terminal and the second terminal, such that if the potential difference between the first terminal and the second terminal is lower than a predetermined starting voltage, the under voltage lockout unit generates an under voltage signal for stopping the operation of the battery balanced charging controller.

2. The battery balanced charging controller of claim 1, wherein the balance circuit comprises a first comparator and a second comparator, and the first comparator is provided for receiving the lower reference potential level and the potential level of the connecting point to output a first comparison signal, and the second comparator is provided for receiving the upper reference potential level and the potential level of the connecting point to output a second comparison signal, and the balance circuit generates a first control signal and a second control signal according to the first comparison signal and the second comparison signal to control the first switch and the second switch respectively, such that if the potential level of the connecting point is lower than the lower reference potential level, the balanced charging current is passed through the first switch, and if the potential level of the connecting point is higher than the upper reference potential level, the balanced charging current is passed through the second switch.

3. The battery balanced charging controller of claim 2, further comprising a resistor coupled to the connecting point and the switch module.

4. The battery balanced charging controller of claim 2, wherein the voltage divider comprises a first resistor, a second resistor and a third resistor, serially connected, and the first resistor is coupled to the first terminal, and the third resistor is coupled to the second terminal, and the second resistor is coupled to the first resistor for producing the upper reference potential level and coupled to the third resistor for producing the lower reference potential level, and impedance of the first resistor and the third resistor are equal, and the impedance of the second resistor is smaller than the impedance of the first resistor.

5. The battery balanced charging controller of claim 2, further comprising a time delay unit coupled to the balance circuit and the switch module, such that one of the first switch and the second switch is conducted after a predetermined time period from the other being cutoff.

6. The battery balanced charging controller of claim 2, further comprising an over-temperature protection unit, for detecting a temperature of the battery balanced charging controller, such that if the temperature exceeds an over-temperature protection point, the over-temperature protection unit generates an over-temperature protection signal to stop the operation of the battery balanced charging controller.

7. The battery balanced charging controller of claim 2, further comprising a start detection circuit, for starting the battery balanced charging controller after receiving a start signal.

8. A battery module, comprising (N+1) battery units, electrically coupled in series, and N being an integer greater than zero; and N battery balanced charging controller, and the $M_{th}$ battery balanced charging controller being coupled to a first terminal, a second terminal and a connecting point of serially connected the $M_{th}$ battery unit and the $(M+1)_{th}$ battery unit, and the $M_{th}$ battery balanced charging controller determining a battery potential level of the $M_{th}$ battery unit and the $(M+1)_{th}$ battery units according to the first terminal, the second terminal and the connecting point, such that if a potential difference between the $M_{th}$ battery unit and the $(M+1)_{th}$ battery unit exceeds a predetermined percentage, a balanced charging current is conducted to the battery unit with a lower battery potential level; and an under voltage lockout unit coupled to the first terminal and the second terminal, such that if the potential difference of the first terminal and the second terminal is lower than a predetermined starting voltage, the under voltage lockout unit generates an under voltage signal to stop the operation of the battery balanced charging controller.

9. The battery module of claim 8, wherein each battery balanced charging controller comprises a first comparator and a second comparator, and the first comparator is provided for receiving a lower reference potential level and a potential level of the connecting point to output a first comparison signal, and the second comparator is provided for receiving an upper reference potential level and the potential level of the connecting point to output a second comparison signal, and the battery balanced charging controller determining whether or not to generate the balanced charging current according to the first comparison signal and the second comparison signal.

10. The battery module of claim 9, wherein each battery balanced charging controller further comprises a voltage divider coupled to the first terminal and the second terminal, for providing the upper reference potential level and the lower reference potential level, and the upper reference potential level is higher than the lower reference potential level.

11. The battery module of claim 10, wherein the voltage divider comprises a first resistor, a second resistor and a third resistor connected in series, and the first resistor is coupled to the first terminal, and the third resistor is coupled to the second terminal, and the second resistor is coupled to the first resistor for producing the upper reference potential level and coupled to the third resistor for producing the lower reference potential level, and the impedance of the first resistor and the third resistor are equal and the impedance of the second resistor is smaller than the impedance of the first resistor.

12. The battery module of claim 9, wherein each the battery balanced charging controller further comprises a switch module including a first switch and a second switch, and the first switch is coupled to the first terminal and the connecting point, and the second switch is coupled to the second terminal and the connecting point, and the battery balanced charging controller determines whether to pass the balanced charging current through the first switch or the second switch according to the first comparison signal and the second comparison signal.

13. The battery module of claim 12, wherein each battery balanced charging controller further comprising a time delay unit, such that one of the first switch and the second switch is conducted after a predetermined time period from the other being cutoff.

14. The battery module of claim 9, wherein each battery balanced charging controller is coupled to the connecting point by a resistor.

15. The battery module of claim 10, wherein each battery balanced charging controller further comprises an over-temperature protection unit, for detecting a temperature of the battery balanced charging controller, and if the temperature exceeds an over-temperature protection point, then the over-temperature protection unit generates an over-temperature protection signal to stop the operation of the battery balanced charging controller.

16. The battery module of claim 10, wherein each battery balanced charging controller further comprises a start detection circuit for starting the battery balanced charging controller after receiving a start signal.

* * * * *